(12) United States Patent  (10) Patent No.: US 7,435,340 B2
Johnson et al.  (45) Date of Patent: Oct. 14, 2008

(54) WASTEWATER TREATMENT SYSTEM

(75) Inventors: Bruce R. Johnson, Boise, ID (US);
Glen T. Daigger, Englewood, CO (US);
George V. Crawford, Toronto (CA)

(73) Assignees: CH2M HILL, Inc., Englewood, CO (US); CH2M HILL Canada, Ltd., Toronto, ON (CA)

( * ) Notice: Subject to any disclaimer, the term of this patent is extended or adjusted under 35 U.S.C. 154(b) by 0 days.

(21) Appl. No.: 11/864,410

(22) Filed: Sep. 28, 2007

(65) Prior Publication Data

US 2008/0047896 A1  Feb. 28, 2008

Related U.S. Application Data

(62) Division of application No. 10/999,345, filed on Nov. 30, 2004, now Pat. No. 7,279,102.

(51) Int. Cl.
*B01D 21/24* (2006.01)
(52) U.S. Cl. .................. 210/97; 210/137; 210/102; 210/143; 210/138
(58) Field of Classification Search .................. 210/97, 210/607, 137, 102, 143, 138
See application file for complete search history.

(56) References Cited

U.S. PATENT DOCUMENTS

| | | |
|---|---|---|
| 5,480,548 A | 1/1996 | Daigger |
| 5,811,009 A | 9/1998 | Kos |
| 6,312,599 B1 | 11/2001 | Reid |
| 6,723,244 B1 | 4/2004 | Constantine |
| 6,808,628 B2 | 10/2004 | Chang |
| 7,279,102 B2 | 10/2007 | Johnson et al. |

OTHER PUBLICATIONS

Grady, et al., Biological Wastewater Treatment, Second Edition, Marcel Dekker, New York (1999).
Daigger, et al., "Process and Kinetic Analysis of Nitrification in Coupled Trickling Filter/Activated Sludge Processes," Water Environment Research, vol. 65, pp. 679-685 (1993).
Tendaj-Xavier, "Biological Treatment of Sludge Water from Centrifugation of Digested Sludge," Dissertation a the Royal Technical University (1983).
Kos, P., "Short SRT (Solids Retention Time) Nitrification Process/Flowsheet," Wat. Sci. Tech., vol. 38, No. 1, pp. 23-29 (1998).

(Continued)

*Primary Examiner*—Chester T. Barry
(74) *Attorney, Agent, or Firm*—Perkins Coie LLP (57) ABSTRACT

This disclosure describes wastewater treatment systems and methods of treating wastewater. In one exemplary method, a wastewater is split into first and second wastewater fractions. The first fraction is delivered to a membrane bioreactor, which may produce an effluent with a low pollutant concentration, and the second fraction is delivered to a biological wastewater treatment system, which may yield a higher pollution concentration yet have a shorter solids retention time. Some implementations of the invention can routinely meet or even exceed pollution discharge standards quite economically during normal operation, yet retain significant flexibility for handling seasonal or sudden variations in the flow rate of wastewater into the system. In select adaptations, waste activated sludge containing heterotrophs, autotrophs, and (optionally) polyphosphate accumulating organisms is delivered from the membrane bioreactor to the biological wastewater treatment system.

24 Claims, 2 Drawing Sheets

OTHER PUBLICATIONS

Anthonisen, et al., "Inhibition of nitrification by ammonia and nitrous acid," Journal of the Water Pollution Control Federation, vol. 48, pp. 835-852 (1976).

U.S. Environmental Protection Agency, "Process Design Manual for Nitrogen Control," EPA/625/R-93010, Cincinnati, Ohio (1993).

Bidstrup, et al. (1988) Journal WPCF 60:351-361.

Constantine (1996) Masters Thesis, McMaster University, "Bioaugmentation To Achieve Nitrification In Activated Sludge Systems," p. 3.

Crawford, et al. (2000) Proceedings of the 29th WEAO Conference and Technical Symposium, Hamilton, Ontario.

Cartoon, Italy, 2003, 1 page.

Constantine, T., et al., "New Nitrifier Bioaugmentation Process Configuration to Achieve Year Round Nitrification At low SRTs," Canada, Oct. 2001, 20 pages.

Constantine, T., et al., "New Process Configuration To Achieve Year Round Nitrification At Low SRTs," Canada, Apr. 2001, 12 pages.

Constantine, T., et al., "The Evaluation of Nitrifier Bioaugmentation Process Configurations," Apr. 2002, 13 pages.

WASTEWATER TREATMENT SYSTEM

CROSS-REFERENCE TO RELATED APPLICATION

The present application is a Divisional of U.S. patent application Ser. No. 10/999,345, now U.S. Pat. No. 7,279,102 filed Nov. 30, 2004, the disclosure of which is incorporated herein by reference in its entirety.

TECHNICAL FIELD

The present invention generally relates to wastewater treatment systems and methods. Aspects of the invention enable production of a high-quality effluent from a wastewater influent at a reasonable cost over a wide range of influent flow and pollutant loading rates.

BACKGROUND

Regulation of pollutant discharges from municipal wastewater treatment systems has become more stringent in recent years. In response, many municipalities have deployed new wastewater treatment systems or retrofitted existing systems to reduce pollutant discharge. Pollutants can be of many forms with the most common being Biochemical Oxygen Demand (BOD), Chemical Oxygen Demand (COD), Total Suspended Solids (TSS), ammonia, total nitrogen, nitrate, nitrite and phosphorous.

Biological treatment systems such as conventional activated sludge systems and membrane bioreactors are one method to reduce the pollutants in a wastewater influent. Biological treatment systems are designed and operated to retain an adequate amount of activated sludge such that the pollutant load contained in the water treated by the system will be adequately reduced. The amount of activated sludge is related to the Solids Retention Time (SRT) of the system, and the minimum SRT required to treat various pollutants under various conditions is generally well known. Conventional activated sludge systems retain activated sludge by the use of settling or clarification devices and can maintain adequate SRTs to treat pollutants provided that both the flow and the activated sludge concentration to the settling basins or clarifiers are within reasonable limits, which depend upon the area of the settling basins or clarifiers and the characteristics of the activated sludge. Membrane bioreactor systems retain the activated sludge by the use of membrane filtration equipment and can operate successfully at significantly higher activated sludge concentrations than typical for conventional activated sludge systems, but are more limited in their ability to process occasional high flow rates.

The flow rate and pollutant load of an influent treated by a municipal wastewater system, which may include industrial wastewater, residential wastewater, and precipitation runoff, can vary significantly over time. In addition to normal diurnal variations, significant rain events can cause short-term spikes in wastewater influent flow rate and pollutant load. Several systems have been developed that can accommodate significantly varying flow rates and pollutant loads, including membrane bioreactors in combination with flow equalization storage tanks, membrane bioreactors with additional membranes for the treatment of peak flows, conventional activated sludge systems with parallel chemical treatment systems, and conventional activated sludge systems with oversized tanks and clarifiers. Each of these systems for accommodating significantly varying flow rates and pollutant loads significantly increases the operating costs and land area requirements for a wastewater treatment plant, and those systems utilizing parallel chemical treatment systems do not produce as high a quality of effluent.

Varying flow rates and pollution loads are just two factors that must be considered when designing a wastewater treatment system. The characteristics of the wastewater, including its temperature and the types of pollutants that it contains, are another. Many biological treatment systems employ two types of biological material to reduce a wastewater's ammonia, organic material, and nitrate concentrations: autotrophic organisms, which are also called "nitrifiers," are used to convert ammonia to nitrate and heterotrophic organisms are used to remove organic materials and nitrates. The growth rates of "nitrifiers" are usually much lower than those of the heterotrophic organisms. Moreover, the wastewater temperature can significantly impact the growth rate of nitrifiers. See, e.g., Grady, et al., *Biological Wastewater Treatment, Second Edition*, Marcel Dekker, N.Y. (1999).

In northern climates, winter wastewater temperatures are sometimes 10° C. or lower. To ensure sufficient nitrification to meet discharge requirements during winter months, wastewater treatment systems in such climates are typically designed with solids retention times of 8 days or longer. Longer solids retention times require systems with a larger fluid capacity. Increasing the solids retention time in conventional biological treatment systems also increases the mixed liquor suspended solids concentrations, requiring larger-capacity aeration systems and secondary clarifiers, which tends to increase expenses for a wastewater treatment plant because of factors such as higher permitting and operating costs and greater land area requirements.

As an alternative to larger aeration systems and secondary clarifiers, some systems achieve good nitrogen removal at low solids retention times by nitrifier bioaugmentation, in which nitrifiers are added from a separate seed source. For example, wastewater treatment systems that include certain trickling filters/activated sludge processes can partially nitrify ammonia in the trickling filter. See, e.g., Daigger, et al., "Process and Kinetic Analysis of Nitrification in Coupled Trickling Filter/Activated Sludge Processes," *Water Environment Research*, Vol. 65, pp. 679-685 (1993). Nitrifiers grown in the trickling filter are allowed to slough off the filter to "seed" the activated sludge process, enabling stable nitrification at decreased solids retention times in the suspended growth bioreactor.

Another example of nitrifier bioaugmentation is described by Constantine in a 1996 Masters thesis at McMasters University entitled "Bioaugmentation to Achieve Nitrification in Activated Sludge Systems." Two parallel sequencing batch reactors are operated at two different solids retention times. One sequencing batch reactor is operated at a solids retention time long enough to ensure thorough nitrification; this reactor is called the "donor" reactor. The other sequencing batch reactor is operated at a solids retention time too short to allow significant nitrification; this reactor is called the "receiver" reactor. Waste activated sludge is directed from the donor to the receiver reactor, resulting in a constant supply of nitrifiers from the donor to the receiver reactor. This allows significant nitrification to occur in the receiver reactor at solids retention times less than those required absent the bioaugmentation. (See also Constantine's U.S. Pat. No. 6,723,244.)

Tendaj-Xavier proposed a two-stage wastewater treatment process in a 1983 dissertation at the Royal Technical University entitled "Biological Treatment of Sludge Water from Centrifugation of Digested Sludge." The dissertation generally suggests growing nitrification bacteria on the dewatering centrate produced within a wastewater plant and seeding the nitrified bacteria into the primary wastewater stream. However, Tendaj-Xavier observes that the high initial capital expense and/or increased space requirements of the proposed system could be prohibitive.

The process described in U.S. Pat. No. 5,811,009 (Kos) also relies on bioaugmentation. See also P. Kos, "Short SRT (Solids Retention Time) Nitrification Process/Flowsheet," *Wat. Sci. Tech.*, Vol. 38, No. 1, pp. 23-29 (1998). The Kos process configuration mitigates some drawbacks of the process proposed by Constantine (1996). Kos' system adds a sidestream reactor, which is distinct from the main waste treatment stream, to treat recycle streams from anaerobic digesters. These recycle streams are rich in ammonia, which is released during anaerobic digestion, and support an enriched culture of nitrifiers in the sidestream reactor. The temperature of the recycle streams is often elevated, which promotes nitrification. Kos' steady-state simulations suggested that the described process allowed nitrification of the main waste treatment stream at reduced solids retention times.

The Kos process configuration has potential problems, especially with respect to the sidestream plant operation. For example:

This system may require high supplementary alkalinity to maintain process stability.

Substrate and product inhibition in this process may render the process unstable, as described in Anthonisen, et al., "Inhibition of nitrification by ammonia and nitrous acid," *Journal of the Water Pollution Control Federation*, Vol. 48, pp. 835-852 (1976).

The poor settling characteristics of enriched nitrifier cultures may interfere with maintaining consistent solids retention times in the side stream reactor. See, e.g., "U.S. Environmental Protection Agency, Process Design Manual for Nitrogen Control," EPA/625/R-93/010, U.S. Environmental Protection Agency, Cincinnati, Ohio (1993).

The entirety of each of these patents and other publications, and of any patents or other publications referred to below, is incorporated herein by reference.

DETAILED DESCRIPTION

A. Overview

Various embodiments of the present invention provide systems and methods for treating wastewater. Many embodiments of the invention are capable of receiving an influent that exceeds one or more environmental standards and discharging an effluent that meets current environmental standards, including limitations on BOD, COD, TSS, ammonia, nitrate, nitrite, total nitrogen, and phosphorus levels. Aspects of the invention may be selected to maximize treatment efficacy during "normal" operation, yet yield acceptable discharge quality with the same system even during high input periods.

A method of treating wastewater in accordance with one embodiment includes splitting wastewater that has a concentration of a pollutant into a first wastewater fraction having a first concentration of the pollutant that exceeds the permitted discharge standard for the pollutant and a second wastewater fraction having a second concentration of the pollutant that exceeds the permitted discharge standard for the pollutant. The first and second concentrations of the pollutant may be the same. The first wastewater fraction, which contains approximately the first concentration, may be delivered to a membrane bioreactor. An effluent is produced from the membrane bioreactor. This effluent has a concentration of the pollutant less than the permitted discharge standard for the pollutant. The second wastewater fraction, which contains approximately the second concentration, may be delivered to a biological wastewater treatment system. An effluent is produced from a biological wastewater treatment system. This effluent has a concentration of the pollutant greater than the permitted discharge standard. At least a portion of the effluent from the membrane bioreactor is combined with at least a portion of the effluent from the biological wastewater treatment system to create a blended effluent having a concentration of the pollutant no greater than the permitted discharge standard.

An alternative embodiment of the invention provides a wastewater treatment system that includes an influent splitter, a first wastewater processor, a second wastewater processor, and an effluent path. The influent splitter is configured to receive an influent, which has a concentration of a pollutant that exceeds the permitted discharge standard for the pollutant, and to deliver a first fraction of the influent to a first inlet and deliver a second fraction of the influent to a second inlet. The first wastewater processor is in fluid communication with the first inlet and includes a first outlet and a membrane bioreactor in a first wastewater path from the first inlet to the first outlet. The first wastewater processor is configured to produce a first effluent having a concentration of the pollutant less than the permitted discharge standard. The second wastewater processor is in fluid communication with the second inlet and includes a second outlet and a biological wastewater treatment system in a second wastewater path from the second inlet to the second outlet. The second wastewater processor is configured to produce a second effluent that has a concentration of the pollutant greater than the permitted discharge standard. The effluent path is configured to receive at least a portion of the first effluent and at least a portion of the second effluent and deliver a blended effluent that has a concentration of the pollutant no greater than the permitted discharge standard.

Another embodiment of the invention provides a method of treating wastewater that includes splitting a wastewater flow, which has a load for a pollutant that exceeds a permitted discharge standard for the pollutant, into a first wastewater fraction having a first load for the pollutant and a second wastewater fraction having a second load for the pollutant. When the load is no greater than a load capacity of a membrane bioreactor (which has a first solids retention time), the first load is at least about 35% of the load; when the load is greater than the load capacity of the membrane bioreactor, the first load is no less than about 50%, e.g., 75% or greater, of the load capacity of the membrane bioreactor. The first wastewater fraction, which contains approximately the first load, is delivered to the membrane bioreactor. An effluent is produced from the membrane bioreactor; this effluent has a load for the pollutant less than the permitted load discharge standard for the pollutant. The second wastewater fraction, which contains approximately the second load, is delivered to a biological wastewater treatment system that has a second solids retention time. The second solids retention time is no greater than the first solids retention time and is optimally substantially less than the first solids retention time.

A method of treating wastewater in accordance with still another embodiment of the invention includes splitting a wastewater flow, which has a flow rate and a concentration for a pollutant that exceeds a permitted discharge standard for the pollutant, into a first wastewater fraction having a flow rate and a second wastewater fraction having a flow rate. When the flow rate of the wastewater flow is no greater than a flow rate capacity of a membrane bioreactor, which has a first solids retention time, the flow rate of the first wastewater fraction is at least about 50% of the flow rate; when the flow rate of the wastewater flow is greater than the flow rate capacity of the membrane bioreactor, the flow rate of the first wastewater fraction is no less than about 50%, e.g., 75% or greater, of the flow rate capacity of the membrane bioreactor. The first wastewater fraction is delivered to the membrane bioreactor and an effluent is produced from the membrane bioreactor. This effluent has a concentration for the pollutant that is less than the permitted discharge standard for the pollutant. The second wastewater fraction is delivered to a biological wastewater treatment system that has a second solids retention time. The second solids retention time is no greater than, and is desirably substantially less than, the first solids retention time.

Another alternative embodiment provides a wastewater treatment system that includes a first wastewater processor, a second wastewater processor, an influent splitter, and a programmable controller. The first wastewater processor includes a first inlet, a first outlet, and a membrane bioreactor in a first wastewater path from the first inlet to the first outlet. The membrane bioreactor has a first solids retention time and a flow rate capacity. The second wastewater processor includes a second inlet, a second outlet, and a biological wastewater treatment system in a second wastewater path from the second inlet to the second outlet. The biological wastewater treatment system has a second solids retention time that is shorter than the first solids retention time. The influent splitter is configured to deliver a first fraction of an influent having a flow rate to the first inlet and to deliver a second fraction of the influent to the second inlet. The programmable controller is operatively connected to the influent splitter to control flow rate parameters of the first and second wastewater fractions such that: when the flow rate of the influent is no greater than the membrane bioreactor flow rate capacity, the first flow rate is at least about 65% of a flow rate of the influent; and when the flow rate of the influent is greater than the bioreactor flow rate capacity, the first flow rate is no less than about 75% of the membrane bioreactor flow rate capacity.

Yet another embodiment provides a method of treating wastewater with a system that includes a membrane bioreactor having a bioreactor target flow rate and a biological wastewater treatment system having a minimum flow rate. A wastewater flow that has a flow rate and a concentration for a pollutant that exceeds a permitted discharge standard for the pollutant is split into a first wastewater fraction having a first flow rate and a second wastewater fraction having a second flow rate. When the wastewater flow rate is no greater than a flow rate breakpoint, which is equal to the sum of the bioreactor target flow rate and the minimum flow rate, the second flow rate is approximately the minimum flow rate and the first flow rate comprises the wastewater flow rate minus the second flow rate. When the wastewater flow rate is greater than the flow rate breakpoint, the first flow rate is approximately the bioreactor target flow rate and the second flow rate comprises the wastewater flow rate minus the first flow rate. The first wastewater fraction is delivered to the membrane bioreactor and an effluent from the membrane bioreactor is produced. This bioreactor effluent has a concentration for the pollutant that is less than the permitted discharge standard for the pollutant. The second wastewater fraction is delivered to a biological wastewater treatment system that has a second solids retention time that is no greater than, and is desirably less than, the first solids retention time.

A method of treating wastewater in accordance with a further embodiment includes delivering a first wastewater stream to a single-stage biological treatment system containing a membrane bioreactor to produce a first effluent. The first wastewater stream includes a biochemical oxygen demand (BOD) concentration that is greater than the permitted BOD discharge standard and the first effluent has a BOD concentration that is no greater than the permitted BOD discharge standard. A second wastewater stream containing a wastewater pollutant concentration is delivered to a biological wastewater treatment system to produce a second effluent, which has an effluent pollutant concentration less than the wastewater pollutant. A portion of a waste activated sludge from the single-stage biological treatment system is delivered to the biological wastewater treatment system. This waste activated sludge may include at least about 35 weight percent heterotrophs, no more than about 8 weight percent, e.g., 3 weight percent or less, of autotrophs. Optionally, the waste activated sludge may include at least about 10 weight percent polyphosphate accumulating organisms.

Another alternative embodiment provides a wastewater treatment system that includes a first wastewater processor, a second wastewater processor, an influent splitter, and a programmable controller. The first wastewater processor includes a first inlet, a first outlet, and a membrane bioreactor in a first wastewater path from the first inlet to the first outlet. The membrane bioreactor has a first solids retention time and a load capacity. The second wastewater processor includes a second inlet, a second outlet, and a biological wastewater treatment system in a second wastewater path from the second inlet to the second outlet. The biological wastewater treatment system has a second solids retention time that is shorter than the first solids retention time. The influent splitter is configured to deliver a first fraction of the influent to the first inlet and to deliver a second fraction of the influent to the second inlet. The programmable controller is operatively connected to the influent splitter to control flow rate parameters of the first and second wastewater fractions such that: when a load of the system influent is no greater than the membrane bioreactor load capacity, the first fraction has a load at least about 35% of the load of the influent; and when the load of the influent is greater than the membrane bioreactor load capacity, the first fraction has a load that is no less than about 50% of the membrane bioreactor load capacity.

For ease of understanding, the following discussion is separated into two areas of emphasis. The first section describes wastewater treatment systems in accordance with certain embodiments of the invention. The second section outlines methods of treating wastewater in accordance with other embodiments of the invention.

B. Wastewater Treatment Systems

Figure 1:
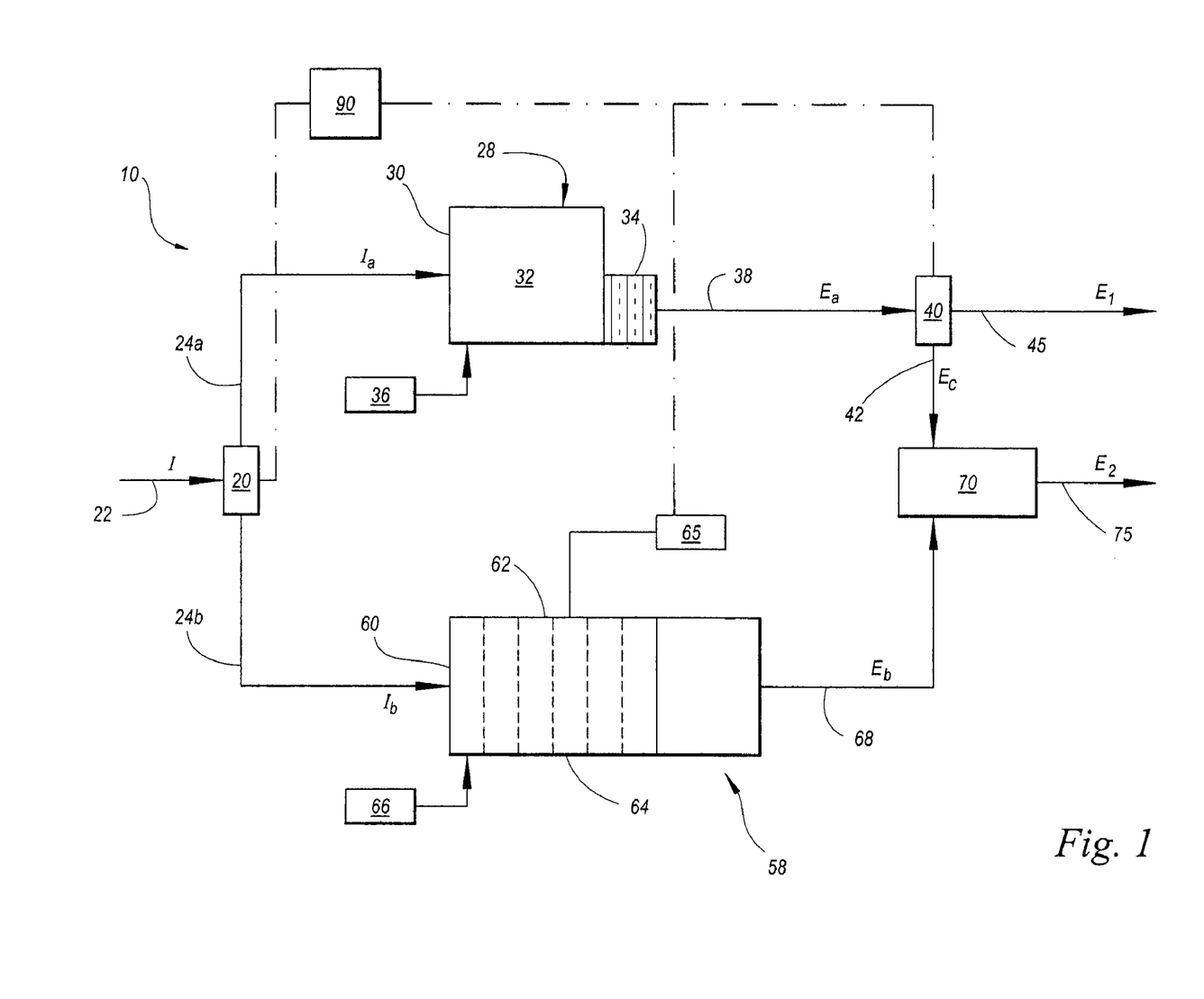
FIG. 1 is a schematic overview of a wastewater treatment system in accordance with an embodiment of the invention.
Figure 2:
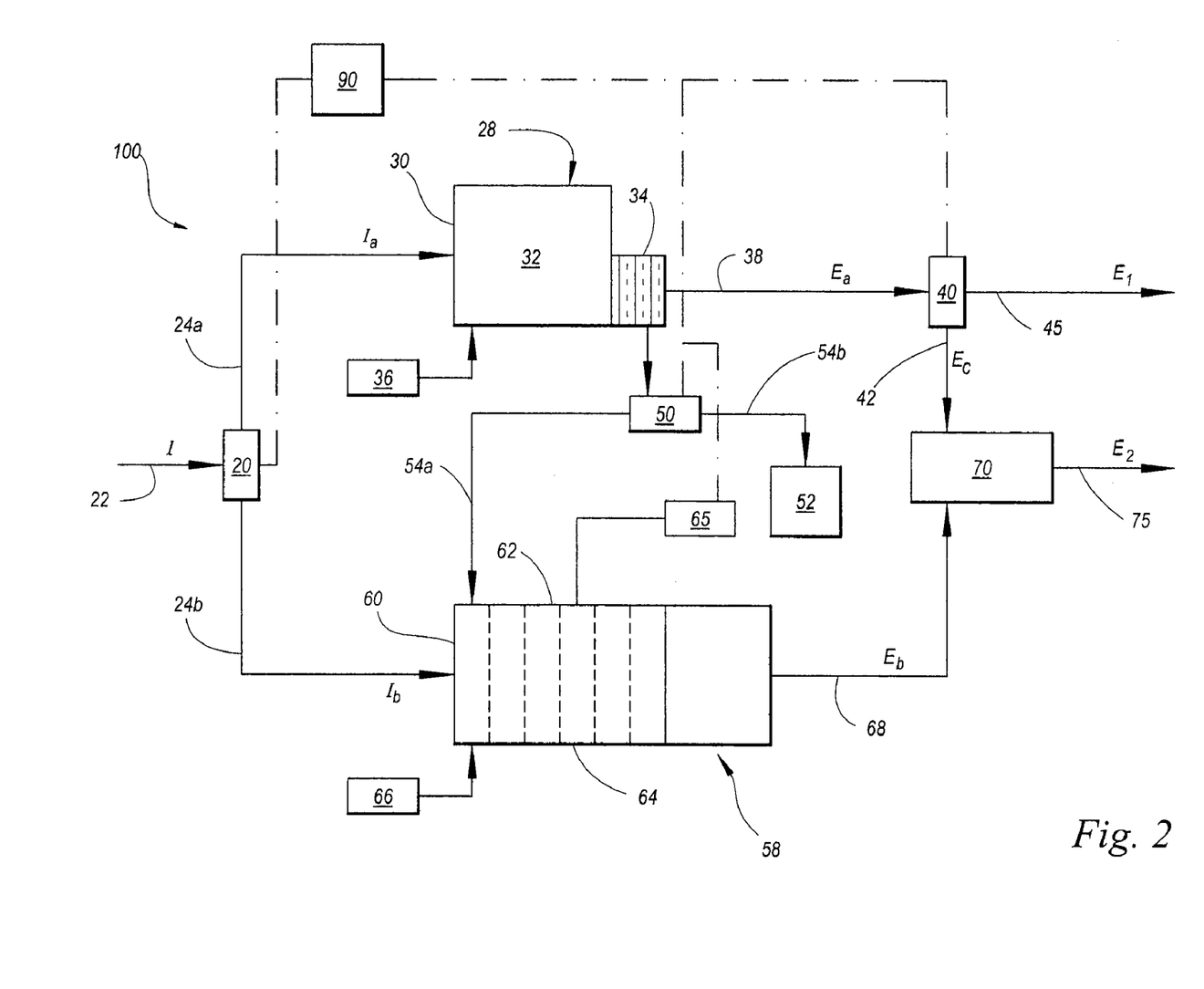
FIG. 2 is a schematic overview, similar to FIG. 1, of a wastewater treatment system in accordance with another embodiment of the invention.

FIGS. 1 and 2 schematically illustrate wastewater treatment systems 10 and 100, respectively, in accordance with embodiments of the invention. The system 10 of FIG. 1 generally includes a pair of parallel biological systems for treating wastewater. Wastewater is delivered to an influent splitter 20 of the system 10 that divides an influent stream I from an inlet conduit 22 into two separate influent streams $I_a$ and $I_b$. The influent stream I and the two separate influent streams $I_a$ and $I_b$ may contain one or more pollutants in amounts that exceed the permitted discharge standard for the specific pollutant.

Different pollutants will have different permitted discharge standards, which typically are established by government agencies or regulatory authorities and which may be based on concentration, on load, or on both concentration and load. A concentration-based standard is usually expressed as mass of pollutant per volume of water; a load-based standard is usually expressed as mass of pollutant per period of time. For example, a concentration-based permitted discharge standard may be expressed as 2 mg P/L for phosphorous, as 10 mg N/L for total nitrogen, and as 7 mg N/L for ammonia. When the permitted discharge standard is based on load, it may be expressed, e.g., as 200 lbs P/day for phosphorous, as 1,000 lbs N/day for total nitrogen, and as 700 lbs N/day for ammonia. When the permitted discharge standard is a combination of both load and concentration, the ammonia discharge standard might be expressed as 700 lbs N/day for ammonia with a daily average maximum allowable concentration of 2 mg N/L for ammonia to ensure that no single day has too high of an ammonia concentration.

Knowing the flow rate of wastewater being discharged from a plant allows conversion of a permitted discharge standard based on load to a standard based on concentration and vice versa. For example, if the permitted discharge standard for ammonia based on load was 700 lbs N/day and the flow rate of the wastewater being discharged was 10 million gallons per day (MGD), then the target discharge concentration of ammonia would be 8.4 mg N/L, on average. Note that the load-based discharge standard will not vary with variations in the flow rate of wastewater discharged from a plant, but a concentration-based discharge will. For example, if the permitted ammonia discharge standard is 700 lbs N/day, which is a load-based standard, and the flow rate of the wastewater is 10 million gallons per day (MGD), then the target effluent ammonia concentration would be 8.4 mg N/L (on average); if, however, the flow rate increased to 30 MGD flow, then the permitted ammonia discharge standard based on load, which was the original standard, would remain at 700 lbs N/day but the target ammonia discharge concentration would drop to 2.8 mg N/L.

The first influent stream $I_a$ is delivered to a first wastewater processor 28 via a first delivery conduit 24a. The second influent stream $I_b$ is delivered to the second wastewater processor 58 via a second influent conduit 24b. As discussed below, the influent splitter 20 can be selectively controlled by a programmable controller 90 or an operator to control the relative flow rates or pollutant loads of the first and second influent streams $I_a$ and $I_b$.

The first wastewater processor in FIG. 1, which in some embodiments is a single-stage biological system, includes a membrane bioreactor 30. The membrane bioreactor 30 may have a pollutant load capacity, a flow rate capacity, or a pollutant load capacity and a flow rate capacity. In some embodiments, the membrane bioreactor 30 has a pollutant load capacity that equals or exceeds the majority of anticipated pollutant load conditions, but it has a flow rate capacity that cannot adequately handle anticipated high flow events that may occur, e.g., due to precipitation, seasonal conditions, or diurnal flow variations. Membrane bioreactors generally include a holding tank 32 and a filter 34 that includes one or more membranes (not separately illustrated). Suitable membrane bioreactors are generally known in the art and need not be detailed here. PCT International Publication No. WO 00/37369 describes one membrane bioreactor design, though, and membrane filters are commercially available from a variety of sources, including Zenon Environmental Inc. of Oakville, Ontario, Canada and US Filter Corporation of Warrendale, Pa., USA.

The concentration and type of microorganisms used in the membrane bioreactor 30 may vary depending on the nature of the first influent stream $I_a$. For example, the membrane bioreactor 30 may include one or more of the following microorganisms: "nitrifiers" or autotrophic organisms, which oxidize ammonia; heterotrophic organisms, which primarily oxidize organic material and reduce nitrates to nitrogen; and polyphosphate accumulating organisms (PAOs). The membrane bioreactor 30 of FIG. 1 may be a single-stage bioreactor, which employs one common biomass to reduce both ammonia and BOD content. An additives supply 36 may be used to deliver any microorganisms or chemicals necessary to improve or optimize the performance of the membrane bioreactor 30.

In one embodiment, the membrane bioreactor 30 also includes a population of polyphosphate accumulating organisms (PAOs) and an anaerobic zone of sufficient size to promote effective growth of the PAOs. Conventional enhanced biological phosphorous removal employs PAOs to remove soluble phosphates found in the influent $I_a$. An alternative embodiment also employs PAOs to remove phosphates, but does so without employing an anaerobic zone. Conventional removal of part of the membrane retentate to maintain optimal performance of the membrane bioreactor 30 results in the net removal of phosphorous from the influent wastewater.

The fluids passing through the filter 34 define a membrane bioreactor effluent $E_a$. This effluent $E_a$ may be delivered to an effluent splitter 40 via an effluent conduit 38. The effluent splitter 40 is adapted to control the relative proportions of a first system effluent $E_1$ and a diverted effluent $E_c$. In many embodiments, the effluent $E_a$, the first system effluent $E_1$, and the diverted effluent $E_c$ are high quality effluents, i.e., effluents that contain one or more pollutant concentrations less than the permitted discharge standard for the specific pollutant. The first system effluent $E_1$ may be discharged to the environment or delivered for reuse via a discharge conduit 45. The diverted effluent $E_c$ may be delivered to an effluent mixing station 70 for mixture with a biological treatment effluent $E_b$, discussed below.

As noted above, the second influent stream $I_b$ is delivered to a second wastewater processor 58, which may comprise a biological wastewater treatment system such as a conventional activated sludge system 60. A wide variety of activated sludge processes are known in the art and need not be detailed here.

In the embodiment shown in FIG. 1, the activated sludge system 60 includes a basin 62, which has a series of different functional zones (illustrated schematically by dashed lines). U.S. Pat. No. 5,480,548 (Daigger et al.) discloses one suitable activated sludge treatment system that may be employed in the basin 62.

An additives supply 66 may supply microorganisms or chemicals needed to optimize wastewater treatment in the basin 62. In the illustrated embodiment, an oxygen supply 65, which may be a conventional bubbler, delivers an oxygen-containing gas (e.g., air) to one or more zones of the basin 62. This enables control of the oxygen level at one or more stages of the wastewater treatment process.

The activated sludge system 60 may also include a clarifier 64. As known in the art, a clarifier may simply comprise a holding tank in which mixed liquor suspended solids are allowed to settle out of suspension. Any other clarifying system known in the art, such as a chemical clarifier, may be used instead.

The activated sludge system 60 receives the second wastewater influent stream $I_b$, treats the wastewater, and delivers a biological treatment system effluent $E_b$, to a second effluent conduit 68. The second effluent conduit 68 may discharge the effluent $E_b$ to the environment. In FIG. 1, therefore, the conduit 68 directs the biological treatment system effluent $E_b$ to the effluent mixing station 70 where the biological treatment system effluent $E_b$ may be mixed with the diverted effluent $E_c$ from the effluent splitter 40. The quality of the diverted effluent $E_c$ is typically higher than that of the biological treatment system effluent $E_b$. In some embodiments, the biological treatment system effluent $E_b$ will contain one or more pollutant concentrations that exceed the permitted concentration discharge standard for the specific pollutant, but the membrane bioreactor effluent $E_a$ may have concentrations of those pollutants that are less than the permitted concentration discharge standard. Mixing effluent streams $E_b$ and $E_c$ yields a blended effluent $E_2$. By controlling the effluent splitter 40, the proportions of the two incoming effluent streams $E_b$ and $E_c$ can be selected to produce a blended effluent $E_2$ that has pollutant concentrations no greater than the pertinent permitted concentration discharge standards. This blended effluent $E_2$ may be delivered to the environment or for reuse via outlet conduit 75.

In one embodiment, the effluent mixing station 70 comprises a holding tank, for example, a lagoon, where the two effluent streams are passively allowed to mix. In other embodiments, the effluent mixing station 70 may utilize mixers or other mechanical systems to actively mix the two effluent streams prior to discharge.

FIG. 2 schematically illustrates a wastewater treatment system 100 in accordance with a further embodiment of the invention. Many elements of this system 100 may be essentially the same as those shown in FIG. 1 and the same reference numbers are used in FIGS. 1 and 2 to identify like elements.

The system 100 of FIG. 2 employs a portion of the retentate of the filter 34 of the membrane bioreactor 30 to supply part or all of the waste activated sludge (WAS) used in the activated sludge system 60. As known in the art, WAS may be removed from the filter 34 at variable rates to sustain acceptable performance of the membrane bioreactor 30. The removed WAS may be received by a WAS splitter 50, which divides the flow of WAS between a first sludge conduit 54a and a second sludge conduit 54b. The first sludge conduit 54a delivers a controlled portion (which may be selectively varied between about 0% and about 100%) of the WAS from the membrane bioreactor 30 to the second wastewater processor, typically to the first zone of the basin 62. The second sludge conduit 54 may deliver the remainder of the WAS to a WAS disposal 52.

The WAS from the membrane bioreactor 30 will include both autotrophs and heterotrophs, permitting the activated sludge system 60 of FIG. 2 to effectively oxidize organic material and reduce nitrates and nitrify ammonia. In one embodiment, the biological population of the WAS includes about 15-50 weight percent (wt. %), desirably at least about 35%, oxidizing agents (e.g., heterotrophs) and no more than about 8 wt % (e.g., about 2-8 wt. %), preferably no more than about 3 wt. %, nitrifying agents (i.e., autotrophs).

In particular, the volume of WAS delivered to the basin 62 may be sufficient to provide effective nitrification even under conditions that do not ordinarily promote effective nitrification, such as short solids retention times. By way of example, the WAS delivered to the basin may be selected to reduce ammonia concentration to within 25% of the permitted ammonia discharge standard As noted above, one embodiment of the invention includes PAOs in the membrane bioreactor 30 to reduce the phosphate content of the membrane bioreactor effluent $E_a$. In such an embodiment, the WAS transferred to the activated sludge system 60 in FIG. 2 will also include PAOs, which can reduce the phosphate content of the biological treatment effluent $E_b$. The weight percentage of PAOs in the WAS and the selected transfer rate of the WAS may be effective to reduce the phosphorous concentration of the biological treatment effluent $E_b$ to within 25% of, and desirably no greater than, the permitted phosphorous discharge standard. In select embodiments, the WAS includes at least about 10 wt. % PAOs.

The programmable controller 90 may be used to control operation of the wastewater treatment system 10 in accordance with one or more of the embodiments outlined below. The programmable controller 90 may comprise a programmable computer, for example, a personal computer or an ASIC-based system. The programmable controller 90 is operatively coupled to the influent splitter 20, the effluent splitter 40, and, in the embodiment of FIG. 2, the WAS splitter 50 to control the relative flow rates of the fluid streams delivered by each of these splitters. The programmable controller 90 may also be coupled to other elements of the system 10, which are not shown in FIG. 1 or FIG. 2, to control other aspects of the system's operation, for example, the oxygen level in the membrane bioreactor 30 and/or the activated sludge system 60.

The wastewater treatment system 10, therefore, may include at least one single-stage biological wastewater processor 28 arranged in parallel with at least one other biological wastewater processor 58 such as an activated sludge system 60. The single-stage biological wastewater processor 28 includes a membrane bioreactor 30, which can treat wastewater quite effectively to deliver high-quality effluent $E_a$, but it may have a relatively long solids retention time. In some embodiments, the membrane bioreactor 30 is preferred for the treatment of a significant portion of the influent stream I. In contrast, the activated sludge system 60 may be less effective at treating wastewater, particularly with respect to nitrogen and phosphorous removal, but it may have a substantially shorter solids retention time. The activated sludge system 60 can be effective for the treatment of occasional excess flow rates or pollution loads that cannot be adequately handled by the membrane bioreactor 30 without the addition of a significant number of additional membranes. In one embodiment, the solids retention time of the membrane bioreactor 30 is typically at least about 6-8 days, e.g., 6-30 days, and the activated sludge system 60 typically has a solids retention time of 5 days or less, e.g., 0.1-5 days. In one embodiment, the solids retention time in the membrane bioreactor 30 is at least about 20 times the solids retention time of the activated sludge system 60.

C. Methods of Treating Wastewater

Other embodiments of the invention provide methods for treating wastewater. Many of these embodiments take advantage of the distinct benefits of the two parallel biological wastewater processors, in other words, the high quality of the membrane bioreactor effluent $E_a$ and the high processing rate of the activated sludge system 60. For ease of understanding, the methods outlined below are discussed with reference to the wastewater treatment systems 10 and 100 of FIGS. 1 and 2. The methods, however, are not limited to any particular system illustrated in the drawings or detailed above; any apparatus that enables performance of a method of the invention may be used instead.

In various embodiments, the incoming flow rate or the pollutant load of the system influent stream I can be measured and communicated to a programmable controller 90 or an operator. The influent can be separated using an influent splitter 20 into a first wastewater fraction $I_a$ having a first flow rate or pollutant load and a second wastewater fraction $I_b$ having a second flow rate or pollutant load. The first wastewater fraction $I_a$ is delivered at approximately the first flow rate or pollutant load to a membrane bioreactor 30 for treatment, and the second wastewater fraction $I_b$ is delivered at approximately the second flow rate or pollutant load to an activated sludge system 60 for treatment.

The sum of the first flow rate and the second flow rate may be approximately equal to the incoming flow rate. In certain embodiments, though, the total of the first and second flow rates may be less than the incoming flow rate. For example, aspects of the invention augment system 10 or 100 by adding one or more additional wastewater processors (not shown), which may include one or more biological processors and/or one or more chemical processors. In such a system, a portion of the incoming flow rate may be diverted to the one or more of the additional wastewater processors.

In some embodiments, the first and second flow rate can be selected based on the incoming flow rate of the system influent stream I and a flow rate capacity of the membrane bioreactor 30. In one implementation, the flow rate of the first wastewater fraction $I_a$ may be maintained in an operating range that is at or near the bioreactor flow rate capacity. Maintaining relatively constant conditions can enhance the efficiency of the membrane bioreactor 30. When the incoming flow rate of the system influent stream I is less than the flow rate capacity of the membrane bioreactor 30, the first flow rate is selected to be no less than a significant portion, preferably at least a majority, of the incoming flow rate of the system influent stream I. For example, the first flow rate may be at least about 65%, e.g., about 80% or greater, of the system influent flow rate.

When the incoming flow rate of the system influent stream I is greater than the flow rate capacity of the membrane bioreactor 30, the first flow rate is selected to be no less than a substantial majority of the flow rate capacity of the membrane bioreactor 30. For example, the first flow rate may comprise at least about 75%, e.g., 80% or more and optimally at least about 90%, of the bioreactor flow rate capacity.

At times, the second flow rate delivered to the activated sludge system 60 could be zero. The activated sludge system 60 may require a minimum flow rate and/or pollution load to sustain biological activity, though. In such an embodiment, the second flow rate may be maintained at or above this minimum sludge system flow rate and/or pollution load, even if this requires that less of the system influent I than otherwise desirable is directed to the membrane bioreactor 30.

In one implementation, the wastewater treatment system (e.g., system 10) may have an influent flow rate breakpoint that is the sum of the minimum sludge system flow rate and a bioreactor target flow rate. The bioreactor target flow rate may be selected to optimize quality and throughput of the membrane bioreactor 30; in many applications, the bioreactor target flow rate may be the bioreactor flow rate capacity. If the flow rate of the system influent stream I is at or below this breakpoint, the minimum sludge system flow rate may be delivered to the activated sludge system 60 and the balance of the system influent flow rate may be delivered to the membrane bioreactor 30. If the flow rate of the system influent stream I is greater than the influent flow rate breakpoint, the flow rate of the first wastewater fraction $I_a$ delivered to the membrane bioreactor 30 is a substantial majority (e.g., 75%, 80%, or even 90% or greater) of the bioreactor flow rate capacity and the balance of the system influent flow rate may be delivered to the activated sludge system 60.

In some embodiments, the first flow rate of influent delivered to the membrane bioreactor 30 is kept substantially constant for a select period of time, e.g., 12 hours or more, while the second flow rate of influent delivered to the activated sludge system 60 can vary during the select period of time. The variations in the second flow rate may be directly proportional to the variations in the incoming flow rate of the system influent stream I. If the activated sludge system 60 has a minimum required flow rate for stable operation, the second flow rate is selected to be no less than the minimum flow rate.

In some embodiments, the first and second load for a pollutant can be selected based on the incoming pollutant load of the system influent stream I and the membrane bioreactor's 30 load capacity for the pollutant. When the incoming pollutant load of the system influent stream I is less than the pollutant load capacity of the membrane bioreactor 30, then the first pollutant load is selected to be no less than a significant portion of the incoming pollutant load of the system influent stream I. For example, the first pollutant load may be at least about 35%, preferably at 65%, of the incoming pollutant load. When the incoming pollutant load of the system influent stream I is greater than the pollutant load capacity of the membrane bioreactor 30, then the first pollutant load is selected to be no less than a substantial portion of the pollutant load capacity of the membrane bioreactor 30. For example, the first pollutant load may be at least about 50%, preferably at least 75%, of the pollutant load capacity of the membrane bioreactor 30.

The sum of the first pollutant load and the second pollutant load may be approximately equal to the incoming pollutant load. In certain embodiments, however, the total of the first and second pollutant load may be less than the incoming pollutant load. As noted above, aspects of the invention augment system 10 or 100 by adding one or more additional wastewater processors. In such a system, a portion of the incoming pollutant load may be diverted to one or more additional processors.

Once the first and second flow rate or pollutant load are selected, the programmable controller 90 or the operator can adjust the influent splitter 20 to obtain the desired first flow rate or pollutant load for the first wastewater fraction and second flow rate or pollutant load for the second wastewater fraction.

The effluent $E_b$ of the sludge system 60 may exceed the maximum concentration of one or more pollutants, e.g., total nitrogen, ammonia, nitrate, nitrite, or phosphorous, acceptable for discharge from the system 10. In one embodiment, the bioreactor effluent $E_a$ typically has one or more pollutant concentrations, for example, total nitrogen, ammonia, nitrate, nitrite, or phosphorous levels, below that maximum. By mixing the lower-quality sludge system effluent $E_b$ with the higher-quality bioreactor effluent $E_a$ in suitable proportions, the second effluent $E_2$ of the system 10 can meet the discharge requirements and be discharged from the system 10. In one implementation, the controller 90 may control the effluent splitter 40 to control the amount of the bioreactor effluent $E_a$ delivered to the effluent mixing station 70 to ensure that the second effluent $E_2$ meets the discharge requirements. If so desired, the controller may deliver to the effluent mixing station 70 no more than the minimum necessary to produce a second effluent $E_2$ that just meets the discharge requirements or has a quality that surpasses the discharge requirements by no more than a selected safety margin. This will increase the volume of the high-quality first effluent $E_1$, which may have more beneficial reuse options than the second effluent $E_2$.

In further embodiments of the invention, the composition of the sludge system effluent $E_b$ may be adjusted to further improve the quality of the total system effluent ($E_1+E_2$). In one embodiment, the controller 90 adjusts conditions in the activated sludge system 60 to affect the composition of the resultant effluent $E_b$. In particular, the controller 90 may receive information regarding the phosphorous or nitrogen content of the sludge system effluent $E_b$ and adjust one or more operating parameters of the sludge system 60. In one embodiment, the controller 90 may control the flow rate of WAS to the activated sludge system 60 by controlling the WAS splitter 50. If the phosphorous or nitrogen content is too high but the mixed liquor suspended solids are at an acceptable level, more WAS may be delivered to the activated sludge system 60; if the mixed liquor suspended solids content gets too high, WAS may be delivered more slowly.

In another embodiment, the controller 90 controls the rate at which oxygen is delivered to the basin 62 by the oxygen supply 65 to affect nitrification. As is known in the art, effective nitrification usually requires the water in the basin 62 to have a minimum oxygen content. The controller 90 may limit the oxygen level in the water in the basin 62 to a level normally incapable of supporting nitrification; this can reduce operating costs in some embodiments. The activated sludge system 60 can still achieve acceptable nitrification of the influent $I_b$ by increasing delivery rate of WAS, which will increase the initial population of nitrifiers. The activated sludge system 60 may be unable to support a sufficient population of nitrifiers on its own, but the addition of more nitrifiers from the WAS will promote more nitrification than the activated sludge system would otherwise support.

The above-detailed embodiments and examples are intended to be illustrative, not exhaustive, and those skilled in the art will recognize that various equivalent modifications are possible within the scope of the invention. For example, steps presented in a given order may be performed in a different order in alternative embodiments. The various embodiments described herein can be combined to provide further embodiments.

In general, the terms used in the following claims should not be construed to limit the invention to the specific embodiments disclosed in the specification unless the preceding description explicitly defines such terms. The inventors reserve the right to add additional claims after filing the application to pursue additional claim forms for other aspects of the invention.

We claim:

1. A wastewater treatment system comprising:
   an influent splitter configured to receive an influent having a concentration of a pollutant that exceeds the permitted discharge standard for the pollutant and to deliver a first fraction of the influent to a first inlet and deliver a second fraction of the influent to a second inlet;
   a first wastewater processor in fluid communication with the first inlet and including a first outlet and a membrane bioreactor in a first wastewater path from the first inlet to the first outlet, the first wastewater processor being configured to produce a first effluent having a concentration of the pollutant less than the permitted discharge standard;
   a second wastewater processor in fluid communication with the second inlet and including a second outlet and a biological wastewater treatment system in a second wastewater path from the second inlet to the second outlet, the second wastewater processor being configured to produce a second effluent having a concentration of the pollutant greater than the permitted discharge standard; and
   an effluent path configured to receive at least a portion of the first effluent and at least a portion of the second effluent and deliver a blended effluent having a concentration of the pollutant no greater than the permitted discharge standard.

2. The system of claim 1 wherein the first wastewater processor is configured to produce the first effluent in a first solids retention time and the secod wastewater processor is configured to produce the second effluent in a second solids retention time that is shorter than the first solids retention time.

3. The system of claim 1 further comprising:
   an effluent splitter configured to receive at least the portion of the first effluent and a programmable controller operatively connected to the effluent splitter and configured to control the effluent splitter to deliver to the effluent path a quantity of the first effluent that is sufficient, when combined with the portion of the second effluent in the effluent path, to yield the blended effluent having the concentration of the pollutant no greater than the permitted discharge standard.

4. The system of claim 1 further comprising a waste activated sludge pathway adapted to deliver waste activated sludge from the first wastewater processor to the second wastewater processor, the waste activated sludge comprising heterotrophs, autotrophs, and polyphosphate accumulating organisms.

5. A wastewater treatment system comprising:
   a first wastewater processor including a first inlet, a first outlet, and a membrane bioreactor in a first wastewater path from the first inlet to the first outlet, the membrane bioreactor having a first solids retention time and a flow rate capacity;
   a second wastewater processor including a second inlet, a second outlet, and a biological wastewater treatment system in a second wastewater path from the second inlet to the second outlet, the biological wastewater treatment system having a second solids retention time that is shorter than the first solids retention time;
   an influent splitter configured to deliver a first fraction of an influent having a flow rate to the first inlet and to deliver a second fraction of the influent to the second inlet; and
   a programmable controller operatively connected to the influent splitter to control flow rate parameters of the first and second wastewater fractions such that
      when the flow rate of the influent is no greater than the membrane bioreactor flow rate capacity, the first flow rate is at least about 65% of a flow rate of the influent, and
      when the flow rate having a flow rate is greater than the membrane bioreactor flow rate capacity, the first flow rate is no less than about 75% of the membrane bioreactor flow rate capacity.

6. A wastewater treatment system comprising:
   a first wastewater processor including a first inlet, a first outlet, and a membrane bioreactor in a first wastewater path from the first inlet to the first outlet, the membrane bioreactor having a first solids retention time and a load capacity;
   a second wastewater processor including a second inlet, a second outlet, and a biological wastewater treatment system in a second wastewater path from the second inlet to the second outlet, the biological wastewater treatment system having a second solids retention time that is shorter than the first solids retention time;

an influent splitter configured to deliver a first fraction of an influent to the first inlet and to deliver a second fraction of the influent to the second inlet; and a programmable controller operatively connected to the influent splitter to control the first and second wastewater fractions such that when a load of the influent is no greater than the load capacity of the membrane bioreactor, the first fraction has a load that is at least about 35% of the load of the influent, and when the load of the influent is greater than the load capacity of the membrane bioreactor, the first fraction has a load that is no less than about 50% of the load capacity of the membrane bioreactor.

7. The system of claim 1 wherein the first wastewater processor and the second wastewater processor are arranged in parallel between the influent splitter and the effluent path.

8. The system of claim 1 wherein the biological waste water treatment system is an activated sludge system.

9. The system of claim 1, further comprising an effluent mixing station positioned to receive at least a portion of the first and second effluents.

10. The system of claim 9 wherein the effluent mixing station is a mechanically active mixing station.

11. The system of claim 5 wherein the first wastewater processor and the second wastewater processor are arranged in parallel.

12. The system of claim 5, further comprising an effluent mixing station positioned to receive at least a portion of the first and second effluents.

13. The system of claim 12 wherein the effluent mixing station is a passive mixing station.

14. The system of claim 5, further comprising an effluent splitter configured to receive at least the portion of the first effluent and operatively connected to the programmable controller, the programmable controller being configured to control the effluent splitter to deliver to the effluent path a quantity of the first effluent that is sufficient, when combined with the portion of the second effluent in the effluent path, to yield the blended effluent having the concentration of the pollutant no greater than the permitted discharge standard.

15. The system of claim 5, further comprising a waste activated sludge pathway adapted to deliver waste activated sludge from the first wastewater processor to the second wastewater processor, the waste activated sludge comprising at least one of heterotrophs, autotrophs, and polyphosphate accumulating organisms.

16. The system of claim 6 wherein the first wastewater processor and the second wastewater processor are arranged in parallel.

17. The system of claim 6, further comprising an effluent mixing station positioned to receive at least a portion of the first and second effluents.

18. The system of claim 6, further comprising an effluent splitter configured to receive at least the portion of the first effluent and operatively connected to the programmable controller, the prdgrammable controller being configured to control the effluent splitter to deliver to the effluent path a quantity of the first effluent that is sufficient, when combined with the portion of the second effluent in the effluent path, to yield the blended effluent having the concentration of the pollutant no greater than the permitted discharge standard.

19. The system of claim 6, further comprising a waste activated sludge pathway adapted to deliver waste activated sludge from the first wastewater processor to the second wastewater processor, the waste activated sludge comprising at least one of heterotrophs, autotrophs, and polyphosphate accumulating organisms.

20. A wastewater treatment system for handling an influent having a concentration of a pollutant that exceeds a permitted discharge standard for the pollutant, comprising:

an influent splitter configured to receive the influent and to deliver a first fraction of the influent to a first inlet and deliver a second fraction of the influent to a second inlet;

a first wastewater processor in fluid communication with the first inlet and including a first outlet and a single-stage biological system in a first wastewater path from the first inlet to the first outlet, the first wastewater processor being configured to produce a first effluent having a concentration of the pollutant less than the permitted discharge standard;

a second wastewater processor in fluid communication with the second inlet and including a second outlet and a biological wastewater treatment system in a second wastewater path from the second inlet to the second outlet, the second wastewater processor being configured to produce a second effluent having a concentration of the pollutant greater than the permitted discharge standard, the second wastewater processor being arranged in parallel with the first wastewater processor; and an effluent path configured to receive at least a portion of the first effluent and at least a portion of the second effluent and deliver a blended effluent having a concentration of the pollutant no greater than the permitted discharge standard.

21. The system of claim 20 wherein the first wastewater processor is configured to produce the first effluent in a first solids retention time and the second wastewater processor is configured to produce the second effluent in a second solids retention time that is shorter than the first solids retention time.

22. The system of claim 20, further comprising an effluent splitter configured to receive at least the portion of the first effluent and a programmable controller operatively connected to the effluent splitter and configured to control the effluent splitter to deliver to the effluent path a quantity of the first effluent that is sufficient, when combined with the portion of the second effluent in the effluent path, to yield the blended effluent having the concentration of the pollutant no greater than the permitted discharge standard.

23. The system of claim 20, further comprising a waste activated sludge pathway adapted to deliver waste activated sludge from the first wastewater processor to the second wastewater processor, the waste activated sludge comprising at least one of heterotrophs, autotrophs, and polyphosphate accumulating organisms.

24. The system of claim 20 wherein the single-stage biological system includes a membrane bioreactor.

* * * * *